United States Patent Office 3,354,202
Patented Nov. 21, 1967

3,354,202
OXIDATION OF POLYMETHYLBENZENES TO
BENZENE POLYCARBOXYLIC ACIDS
Wilford J. Zimmerschied, Crown Point, Donald E. Hannemann, Griffith, and Carl Serres, Jr., Whiting, Ind., assignors to Standard Oil Company, Chicago, Ill., a corporation of Indiana
No Drawing. Filed Apr. 30, 1963, Ser. No. 277,023
10 Claims. (Cl. 260—524)

This invention relates to the preparation of benzene polycarboxylic acids by catalytic liquid phase oxidation of polyalkyl benzenes with molecular oxygen and more particularly pertains to the preparation of benzene polycarboxylic acids of exceptional purity through a particular mode for conducting such catalytic liquid phase oxidation.

By the use of the unique catalyst system disclosed in U.S. Patent 2,833,816 there became available for the first time a process for the production of sufficiently high yields of aromatic polycarboxylic acids such as terephthalic acid, isophthalic acid, trimellitic acid and trimesic acid to make the production of these acids commercially feasible through the catalytic liquid phase oxidation of p-xylene, m-xylene, pseudocumene and mesitylene, respectively, as well as related homologs of these polymethylbenzenes. At time of the discovery leading to the invention disclosed and claimed in U.S. Patent 2,833,816 terephthalic acid was the commercial starting material, through its dimethyl ester, for linear polyesters derived from diols, e.g. ethylene glycol, to prepare fibers and films. Although various routes leading to the preparation of isophthalic acid, trimellitic acid and trimesic acid had been proposed no commercial catalytic liquid phase oxidation process suitable for the preparation of commercial quantities of these benzene polycarboxylic acids was available. In fact, no commercially feasible process for the preparation of the benzene tricarboxylic acids, trimellitic acid and trimesic acid was known and these acids were not even considered for commercial uses. Also, the commercial interest in isophthalic acid, whose superiority over phthalic anhydride had been demonstrated, was lagging perhaps for the reason that there was not available commercial quantities of isophthalic acid of sufficient quality to replace phthalic anhydride of established quality and availability. Commercial operation of the process of U.S. Patent 2,833,816 made available commercial quantities of isophthalic acid, trimellitic acid (as its anhydride) and trimesic acid of acceptable quality for the first time in addition to making available commercial quantities of terephthalic acid for conversion to its dimethyl ester to meet the ever increasing demand for increased production of the fiber and film forming linear glycol-terephthalic acid polyesters.

As is generally the case in the chemical industry, greater availability of basic starting materials leads to new and improved uses. Many of the uses to which products derived from terephthalic acid, isophthalic acid, trimellitic anhydride and trimesic acid had been put began to require that these acids be of higher and higher purity so that end products of lighter color, higher yields and/or of reduced cost could be made. It was known that linear polyester fibers derived from ethylene glycol and dimethyl terephthalate were useful in clothing fabrics, especially blended with other synthetic and/or natural fibers to produce fabrics of superior properties. The desirability of producing light colored and white fabrics from such blends became a market place demand. Similarly resinous products made from isophthalic acid, trimellitic acid or trimesic acid produced a market place demand for not only greater quantities of these acids but also higher and higher quality at decreasing cost.

The foregoing demands were first met by terephthalic acid through its conversion to dimethyl terephthalate which could be distilled to a product of high quality, such as a purity of 99 percent or higher.

It was known that terephthalic acid could be reacted with ethylene glycol and processed into linear polyester products of high molecular weight but of dark color and varying strength. Impurities associated with available terephthalic acid and difficult if not impossible to remove appeared to be a substantial stumbling block if not a bar to using available sources of terephthalic acid to proceed to the required color and strength linear polyesters directly from terephthalic acid and glycol. Various chemical and physical purification schemes were devised with as the goal, the obtaining of a terephthalic acid product of a purity in excess of 99%. Some of these purification processes came close to the goal but only added appreciably to the cost of producing terephthalic acid.

Terephthalic acid produced by the liquid phase oxidation of p-xylene with oxygen, air or other sources of molecular oxygen in the presence of the unique bromine promotion of heavy metal oxidation catalysts according to the process of U.S. Patent 2,833,816 was also confronted by problems of purification because of the apparently unique impurities whose properties were closely similar to terephthalic acid and thus were difficult to remove from the terephthalic acid produced by that process. One impurity found in terephthalic acid produced by that catalytic liquid phase oxidation was identified as 4-carboxybenzaldehyde which, as would be expected, would be a chain stopper in a reaction involving glycol to form a linear polyester and, undergoing aldol condensations, produced at the high polycondensation temperatures employed in making the linear polyethylenterphthalates dark colored products as well as low molecular weight products formed through chain interruption resulting in polyester products of uncontrollable low strength. Other impurities whose precise chemical structure was difficult to determine but having similar effect to 4-carboxybenzaldehyde on the linear polyester formation were detected. Some of these impurities contained two or more benzene ring moieties and were believed to be the result of free radical reactions.

It has now been discovered that terephthalic acid of high purity, 99.9% and higher, can be produced directly by catalytic liquid phase oxidation of p-dialkylbenzenes, especially p-xylene, with air or other source of molecular oxygen using the unique bromine promoted heavy metal catalyst system of U.S. Patent 2,833,816 but departing from the process of this patent in the operation thereof. First, the oxidation process is conducted with a continuous introduction of both p-dialkylbenzene, preferably p-xylene and molecular oxygen, e.g. air or commercial oxygen with the rates of introducing molecular oxygen and p-dialkylbenzene (p-xylene) feeds so controlled and co-ordinated as to provide during the entire addition of dialkylbenzene hydrocarbon, an amount of oxygen in excess of that required and/or consumed by the oxidation reaction. However, the excess of oxygen introduced could not be without limit not only because of the cost of providing oxygen at up to 400 pounds and higher pressure, but also because the excess of oxygen beyond a certain limit causes oxidation of the preferred reaction solvent, acetic acid, and provides an inflammable or explosive mixture of oxygen and at least vapors of acetic acid as well as unreacted p-xylene. Such explosive or inflammable mixtures under the temperature and pressure conditions of the catalytic liquid phase oxidation fall within the range of 8 to 10% oxygen by volume even though nitrogen (from air) or byproduct water vapor is also present. The same excess unreacted oxygen values also produce excessive oxidation of acetic acid and other related saturated lower aliphatic monocarboxylic acids of the acetic acid series ($C_1$ to $C_8$) which are useful as oxidation reaction solvents.

Such catalytic liquid phase oxidation processes are conducted in a corrosion resistant reactor in which there is maintained in a reaction zone portion thereof, generally less than all of the reactor volume, a liquid phase of reaction solvent containing the catalyst and oxidizable hydrocarbon. The reaction mixture can be heated to about reaction temperature before charging to the reactor by external heat exchangers and pumped into the reaction vessel prepressure to reaction pressure or heated in the reactor at reaction pressure by internal or external heating means, coils or electrical elements. Pressurized air, commercial oxygen or mixtures thereof to supply the molecular oxygen is introduced into the oxidation zone. Heat of reaction is removed by withdrawing from the vapor space above the oxidation zone a gasiform mixture containing oxygen (also nitrogen when air is the source of molecular oxygen) vapors of acetic acid, vapors of unreacted p-xylene or other aromatic hydrocarbon being oxidized and water vapor. Acetic acid vapors and aromatic hydrocarbon vapors, if present, are condensed and returned to the oxidation zone. Generally most of the water vapor is also condensed and returned to the oxidation zone since the presence of substantial amounts of water can be tolerated in the oxidation promoted by the unique bromine promoted heavy metal catalyst system.

In a batch oxidation, for example, of p-xylene to terephthalic acid using a volume ratio of acetic acid solvent (95 to 100% acetic acid) to p-xylene of from 2 to 1 to 5 to 1, a catalyst system to provide on a weight percent basis related to p-xylene charged of 0.23% bromide ions, 0.11% manganese ions and 0.06% cobalt ions carried out at 400 to 440° F. and a pressure of 300 to 400 p.s.i.g. with air introduction to maintain about 0.2 to 1.0% oxygen by volume in the exit gas on an acetic acid free basis until the oxidation is substantially complete and then finishing the oxidation with no more than 6 to 8% by volume unreacted oxygen in the exit gas (acetic acid free basis) produces in 40 to 60 minutes yields of terephthalic acid of from 99 to 130 weight percent based on p-xylene charged. The terephthalic acid is recovered by filtration of the effluent from such a batch reaction, is washed with acetic acid and/or water and dried. Such a dry terephthalic acid contains about 1.5 to 3% 4-carboxybenzaldehyde and has an optical density (4 cm. 380 m$\mu$ the measurement thereof is hereinafter described) of 1.20 to 3.00 and an acid number of 670 to 673 (675 is theory). About 2 to 3% of the p-xylene is overoxidized to CO and $CO_2$ but little of the acetic acid solvent is oxidized to CO and $CO_2$.

In the batch oxidation little or no initiation difficulty is experienced with the bromine promoted heavy metal oxidation system provided that the molecular oxygen introduction is started at the oxidation threshold temperature which appears to vary not only with the aromatic hydrocarbon being oxidized but also with the source of molecular oxygen. For example, p- and m-xylene appear to have a threshold oxidation temperature of about 120 to 125° F. when commercial oxygen is employed and about 250 to 300° F. when air is employed as the source of molecular oxygen oxidant. The threshold oxidation temperatures of pseudocumene and mesitylene appear to be somewhat higher. Also is batch oxidations because of the relatively high concentration of aromatic hydrocarbon initially present it is somewhat difficult to supply air at a high enough input rate to provide a detectable amount of unreacted oxygen because the oxygen is being consumed very rapidly and the liquid disengagement in the vapor space of the reactor is at a maximum. Later in the oxidation, when the oxygen consumption is lower because of the disappearance of oxidizable substituents on the aromatic rings, it becomes relatively easier to maintain unreacted oxygen in the exit gas and in the final stage of the oxidation input of molecular oxygen must be reduced to prevent the unreacted oxygen in the exit gas from providing the flammable or explosive concentrations.

The semi-continuous oxidation process of this invention which provides the higher purity aromatic polycarboxylic acids, especially terephthalic, isophthalic, trimellitic and trimesic acids, is conducted by charging to the reactor a solution of the catalyst components in acetic acid either preheated to reaction temperature or heated in the reactor to reaction temperature at the pressure at which the oxidation is to be conducted. This can be accomplished, for example, by pressurizing the reactor with nitrogen to reaction pressure when the acetic acid is to be preheated to about reaction pressure or to a lower pressure when the acetic acid solution is to be heated in the reactor to reaction temperature. Thereafter, when the acetic acid solution of the catalyst is at or near the oxidation temperature (at or above and preferably above the oxidation threshold temperature), the pressure control means in the gasiform exit is adjusted to maintain the desired pressure (as in a batch oxidation) and both the aromatic hydrocarbon and source of molecular oxygen are pumped into the oxidation reactor into the liquid phase of acetic acid solution of the catalyst system. When air is used as the source of molecular oxygen oxidant and p-xylene or m-xylene are being oxidized, air inputs of from 14 to 40 initially and then increased to 50 to 71 standard cubic feet (70° F. and one atmosphere absolute) per pound of the xylene are suitable for ultimate solvent ratios of from 2 to 1 to 5 to 1 (volume ratio acetic acid to xylene). For the purposes of this semi-continuous process, "ultimate solvent ratio" means the ratio of total solvent to total hydrocarbon charged. Such suitable air inputs provide from 1 to 3% oxygen by volume (acetic acid free basis) in the exit gas during the hydrocarbon addition and this range of unreacted oxygen is desirable to not only insure ample oxygen for the needs of the oxidation of any of the polyalkyl aromatics to aromatic polycarboxylic acids but also to guide the desired reactions occurring in the rather complex reaction mechanism (up to 40–50 variables are involved) and prevent competing side reactions from occurring which lead to undesirable impurities either through incomplete oxidation of one or more of the alkyl side chains or through the formation of complex high molecular weight (higher than the desired aromatic polycarboxylic acid) acidic products by free radical mechanisms including condensations. During addition of the aromatic hydrocarbon there should be at least 0.5% oxygen (solvent free basis) in the exit gas as a minimum.

When the input of polyalkyl aromatic, for example p-xylene, has progressed to an accumulated input equal to that of the batch operation (i.e. total hydrocarbon charged provides the ultimate solvent ratio) of the same total hydrocarbon and total solvent charge, the input of aromatic hydrocarbon is stopped and the oxidation is finished as in a batch operation, i.e. until the oxygen in the exit gas cannot be maintained at less than 6 to 8% by volume by further decrease of oxygen input indicating either no oxygen consumption or oxygen consumption below feasible reaction rates. The reaction is terminated and the resulting mixture of solvent, catalyst and aromatic polycarboxylic acid is discharged for recovery of aromatic acid product, for example by depressurizing the fluid slurry from the reactor to about atmospheric pressure with recovery for acetic acid vapors flashed off, cooling the depressurized slurry to 100 to 120° F. or below and separating the aromatic polycarboxylic acid, e.g. by centrifugal separation means or by ordinary filtration, decantation, etc.

Washed (acetic acid and/or water) and dried terephthalic acid produced from 97 to 99% p-xylene by the foregoing semi-continuous process is obtained in yields of 135 to 149 weight percent (theoretical weight percent is 156.6%) with 4-carboxybenzaldehyde contents of from 0.30 to 0.05 percent and below by weight of the recovered terephthalic acid. The optical density of the terephthalic acid recovered is in the range of 0.09 to 0.50 (4 cm. 380m$\mu$). Such yields of terephthalic acid are obtained by total reaction time per oxidation of only slightly longer, up to about 20 to 30% longer, than batch operation reactions. Yet terephthalic acid yield increases of from 24 to 35% over batch operation yields are obtained which offset the longer reaction periods. Moreover, the higher purity terephthalic acid as well as other aromatic polycarboxylic acids obtainable make this semi-continuous oxidation a substantial improvement over the strictly batch operation technique.

In the semi-continuous operation technique of oxidizing polyalkyl aromatic hydrocarbons to aromatic polycarboxylic acids conducted according to this invention, the over oxidation of 2 to 3% of the aromatic hydrocarbon charged still occurs as in the strictly batch operation but at a 2 to 3 volume percent oxygen in the exit gas about 3 to 4% of the acetic acid solvent, more of the higher members of the $C_2$ to $C_8$ aliphatic monocarboxylic acid solvents of the acetic acid series (saturated lower aliphatic monocarboxylic acids) is also oxidized to CO and $CO_2$. Less acetic acid is oxidized to CO and $CO_2$ when exit gases from the oxidation zone contain 1 to 2% unreacted oxygen by volume. Because of the limitations of time response and inherent accuracy of available oxygen analyzers there should be at least 1.0% oxygen by volume (solvent free basis) in the exit gas but there need not be more than 4% oxygen by volume, preferably in the range of 1.0 to 3.0% oxygen by volume, in the exit gas during addition of the polyalkyl aromatic hydrocarbon. The oxygen thereafter for finishing off the oxidation can go to 6 to 8%. In some cases where necessary precautions can be taken to prevent ignition of the gasiform mixture when it is in the 8 to 10% oxygen by volume flammable or explosive mixture condition (which occurs when condensing solvent from the gasiform mixture), the finishing off procedure can be carried out to a 20% oxygen by volume of the exit gas when air is the source of oxidant.

The amount of oxygen in the exit gas can be measured by many available oxygen analyzers. An orsat apparatus is suitable but its use is relatively slow in obtaining oxygen data. The so-called instantaneous oxygen analyzers are far more complex than the orsat apparatus but give oxygen values within 1 to 5 minutes from the time a sample for analysis is withdrawn. Any oxygen analysis apparatus requires that the hot pressurized sample be cooled and depressurized and most of the sensitive analytical instantaneous devices require that the sample be free of corrosive and/or conductive acetic acid or other acid solvent. Hence, for convenience of following the free oxygen content of the exit gas, the values herein disclosed for control of operation are on a solvent free or acetic acid free (if this acid is the solvent) basis.

The theoretical amount of oxygen to be introduced while simultaneously introducing the hydrocarbon is readily calculated from the reaction of the specific hydrocarbon with oxygen to convert all of the polyalkyl aromatic hydrocarbon to the corresponding aromatic polycarboxylic acid. For example, for either p-xylene or m-xylene the theoretical amount of oxygen supplied by air is 51 standard cubic feet of air per pound of p-xylene or m-xylene. An air input of 60 standard cubic feet per pound p-xylene will give 3 to 4% oxygen by volume in exit gas on solvent free basis.

It has been observed that high concentrations of the range of the bromine promoted heavy metal catalyst system of U.S. Patent No. 2,833,816 results in lowest apperance of partially oxidized byproduct impurities in the aromatic polycarboxylic acid products, but the higher metals concentration also provide discoloration of the aromatic acid product. However, even then the resulting aromatic polycarboxylic acid products recovered from the semi-continuous oxidation reaction are substantially purer and have substantially lower color than the same acid products produced by srtictly batch conditions at the same temperature, pressure, catalyst concentration and solvent ratio. The color of the aromatic acid product is measured by reacting the aromatic acid with triethylene glycol (TEG), diluting the reaction product to a standardized concentration and comparing the color of the dilute TEG reaction product with APHA color standards. The color number of the dilute TEG reaction product for typical commercial batch prepared terephthalic acid products will be from 1200 to 2800 as the 4-carboxybenzaldehyde content also varies from about 1.5 to 2.8. Even at high catalyst concentrations in semi-continuous operation the TEG color number of terephthalic acid will be about 600–700 with 4-carboxybenzaldehyde contents of 0.04 to 0.06%. At lower catalyst concentrations terephthalic acid products of TEG color numbers of 100 to 200 with 4-carboxybenzaldehyde contents of about 0.7 to 0.1 are obtainable. High and low catalyst concentration based on hydrocarbon lie within the range of 0.01 of 1.0% total metals. The bromide ion concentration appears to have little or no adverse effect on color or partial oxidation by product impurity content. The minimum level for heavy metal catalyst promotion appears to be 0.01%. The effectiveness of the heavy metal ions as oxidation catalyst varies from metal to metal and with various combinations of metals as is known and expected. The most efficient catalyst system employs a combination of manganese and cobalt ions in the range of 0.04 to 0.2 weight percent total metals based on the aromatic hydrocarbon. The bromide ion concentration on the same basis is then 0.054 to 0.270%.

It has been observed from chemical and physical (e.g. recrystallization) purifications of terephthalic acid produced by strictly batch operation of the oxidation of p-xylene in the liquid phase oxidation process using the bromine promoted heavy metal catalyst system that as the 4-carboxybenzaldehyde impurity content was decreased, the crystal size and shape varied from large crystal agglomerates with 30% or more in the 100 to 300 micron range for the crude terephthalic acid and for purified terephthalic acid having 0.5% or less 4-carboxybenzaldehyde the crystal size of the recovered purified product had 50% or more in the 10–100 micron and lower range and a high percentage of single and twin crystals regardless of the purification technique. It appeared that the smaller the crystal and the higher percentage of single and/or twin crystals, the purer the product. The following crystal size (diameter in microns) tabulation of the purest terephthalic acid produced by strictly batch oxidation (TEG color number 1200 and 1.44% 4-carboxybenzaldehyde, acid No. 673 from an oxidation employing a 2.8/1 solvent ratio) is compared with terephthalic acid product from a semi-continuous process using a 3/1 solvent ratio and the same catalyst concentration, temperature and pressure (TEG color of 200 and 4-carboxybenzaldehyde content of 0.1%).

| Crystal Diameter, Microns | Percent Crystals in each Diameter Range | |
|---|---|---|
| | Batch | Semi-continuous |
| 0–10 | 20 | 10 |
| 10–100 | 50 | 70 |
| 100–200 | | |
| 200–300 | [1] 30 | [2] 20 |
| 300+ | | |
| Total | 100 | 100 |

[1] Sum for the three bracketed size ranges.
[2] Total in this one size range.

It is readily apparent that the smaller crystals (10 to 100 microns) are much more abundant from the semi-continuous oxidation technique than from the strictly batch technique and that the crystals of terephthalic acid from semi-continuous are more uniform in size with only one-half in the very fine 1–10 micron size and none exceeding about 200 microns in diameter. Thus, a decided advantage of the process of this invention is the obtention of a more uniform size distribution crystalline product in addition to the obtention of a purer product in much higher yields. In fact, when the total yield of terephthalic acid, product recovered by separation of reaction slurry plus terephthalic acid remaining in solution, is compared to p-xylene charged less p-xylene overoxidized to CO and $CO_2$, it will be found that the total terephthalic acid produced is about 99% of theory by the semi-continuous process of this invention.

In general, according to the basic method of converting polyalkyl aromatic hydrocarbons to aromatic polycarboxylic acids in a liquid phase oxidation with molecular oxygen as the oxidant and using the unique catalyst system provided by the combination of bromine ions and heavy metal ions, ions of metals chosen from those classified as heavy metals in the "Periodic Chart of Elements," pages 56 and 57 of the "Handbook of Chemistry" 8th edition published by Handbook Publishers, Inc., Sandusky, Ohio, are desirably applicable. Of these heavy metals those having an atomic number not greater than 84 are most suitable and that excellent results are obtained by the use of metals having an atomic number of 23 to 28, inclusive. Metals of the group consisting of manganese, cobalt, nickel, chromium, vanadium, molybdenum, tungsten, tin and cerium alone or combinations therefrom give particularly excellent results. The metals can be used in the elemental, combined or ionic form. Especially useful and preferred are combinations containing cobalt and manganese alone or in combination with other of the heavy metals to supply the heavy metal ions.

Bromine can be used as elemental bromine ($Br_2$), ionic bromine (e.g., NaBr, $NH_4Br$, etc.) or combined (e.g. potassium bromate, tetrabromoethane, benzyl bromide, etc.) which disassociates under the reaction temperature conditions to give bromide ions. Of course, the heavy metal bromides can provide both the heavy metal ions and bromide ions. Organic salts, e.g. acetates, propionates, naphthenates, octanoates, etc. of the metals can be used as well as inorganic salts, e.g. halides, borates, nitrates, etc. and organic complexes such as those from acetylacetonate, 8-hydroxyquinolate, and ethylene diamine tetraacetate of the metals. The bromine to metal ratio can vary from the range of 1 to 10 atoms of bromine per total atoms of metal to 1 to 7 atoms of total metal per atom of bromine. The preferred catalyst system provides 0.2 to 0.3% bromine and 0.04 to 0.2% total of cobalt and manganese, both percentages are by weight, based on the weight of the aromatic hydrocarbon to be oxidized.

In general, the saturated $C_2$ to $C_8$ aliphatic monocarboxylic acid can be used suitably in amounts of from 0.1 to 10 parts by weight per part of aromatic hydrocarbon. Acetic acid (95 to 100%) is the most refractory in this oxidation system of the foregoing $C_2$ to $C_8$ acids and is therefore preferred. It is most convenient when charging an oxidation reactor with liquids to do so on a volume basis. On this basis from 1 to 10 volumes of acetic acid per volume of aromatic hydrocarbon is a desirable ratio of the foregoing suitable range and the preferred volume ratio is in the range of 1 to 1 to 5 to 1 for the polyalkyl aromatic hydrocarbons oxidized by the semi-continuous technique of this invention to higher yields of high purity aromatic polycarboxylic acid.

The oxidations are, in general, suitably carried out at a temperature in the range of from about 120 to about 530° F. (50 to 275° C.) For most polyalkyl aromatic hydrocarbons, especially polymethylbenzenes, the desirable oxidation temperatures are in the range of 300 to 480° F. and preferably in the range of 330 to 450° F. to reduce overoxidation of the aromatic hydrocarbon and to keep the reaction pressure within reasonable values.

For the purposes of this invention, the pressures employed are those to keep the $C_2$ to $C_8$ saturated aliphatic monocarboxylic acid in the liquid phase at reaction temperature before oxidation occurs. After oxidation commences heat of reaction causes boil up of the acid solvent for removal of heat of reaction. It is preferred that the reaction pressure be at least 300 p.s.i.g. to provide high concentration of oxygen in the liquid reaction medium when acetic acid is the reaction solvents but pressures as high as 1500 p.s.i.g. can be used if desired. Pressures of at least 300 p.s.i.g. provide sufficiently high oxygen concentration in the liquid reaction medium for rapid oxidation even when acid solvents boiling substantially above acetic acid are employed.

As hereinbefore indicated air, commercial oxygen, air enriched with commercial oxygen, various oxygen and inert gases (nitrogen, etc.) containing more than 20% oxygen can be employed to provide molecular oxygen oxidant. Ozone can also be used with the foregoing sources of molecular oxygen but only adds to the cost of the process.

It is desired to obtain by the semi-continuous process of this invention higher yields of purer aromatic polycarboxylic acid than obtained from strictly batch processes and obtain efficient utilization of reactor and compressor capacity at lower production costs than provided by strictly batch oxidations. The preferred process of this invention comprises the semi-continuous oxidation of polymethyl aromatic hydrocarbons, preferably polymethylbenzenes, with air in an oxidation zone in which a liquid phase of acetic acid (95 to 100%) is maintained, in the presence of the catalyst system provided by 0.1 to 1.0% bromide ions and 0.04 to 1.0% total metal ions, preferably a combination of cobalt and manganese ions, at a temperature of from 300 to 450° F., pressure at least 300 p.s.i.g., by simultaneously introducing into the reaction zone containing the catalyst system dissolved in the acetic acid said aromatic hydrocarbon and air at an air rate coordinated per pound of aromatic hydrocarbon to provide at least an excess over that theoretically required to oxidize one pound of the aromatic hydrocarbon to provide 0.5% oxygen (solvent free basis) by volume in the gasiform mixture generated from the oxidation zone until the ultimate ratio of acetic acid to the aromatic hydrocarbon charged on a volume per volume basis is in the range of 1 to 1 to 5 to 1, and thereafter continuing only the introduction of air until the adsorption and/or consumption of molecular oxygen from air has substantially ceased. Thereafter the high purity aromatic polycarboxylic acid formed can be recovered by conventional means. The aromatic polycarboxylic acid products produced and recovered by this semi-continuous process are of a substantially high or even higher purity than those obtained under otherwise identical conditions by a combination of strictly batch oxidation with known chemical and/or physical purification processes.

The optical density of the aromatic polycarboxylic acid is a measurement of a solution of the ammonium salt of the acid in ammonium hydroxide. For example, the optical density for terephthalic acid is measured by dissolving 1 g. of terephthalic acid in 25 ml. of aqueous ammonium hydroxide solution which ammonium hydroxide solution is prepared by diluting concentrated ammonium hydroxide (specific gravity 0.880) with an aqueous volume of distilled water. The optical density is determined by measuring the solution of ammonium salt in ammonium hydroxide in a 4 cm. cell at 380 m$\mu$ and in some cases at 340 m$\mu$. The optical density measurement is an indication of the quality, i.e. purity, of the aromatic polycarboxylic acid with the purity increasing as the optical density value decreases, for example, an optical density of 1.2 to 1.6 as indicated for the terephthalic acid produced by strictly batch operation indicates a much lower purity terephthalic acid than a terephthalic acid produced by the semicontinuous process of this invention having an optical density of 0.5 to 0.1 and below.

For a better understanding of the techniques of the process of this invention as applied to the preparation of specific aromatic polycarboxylic acids from particular polyalkyl aromatic hydrocarbons and the yields and qualities of the aromatic polycarboxylic acids to be expected, the following specific examples are given wherein all "parts" are parts by weight.

*Example 1*

For 18.2 parts p-xylene there are dissolved in 91.0 parts of 97% acetic acid tetrabromoethane, manganese acetate tetrahydrate and cobalt acetate tetrahydrate to give 0.46% bromine and 0.34% total of manganese and cobalt based on p-xylene. One-half of the acetic acid solution of the catalyst system is charged into a corrosion resistant tubular oxidation reactor topped by a vertical condenser (operates at 100° F.) vented through a pressure reducer set at 400 p.s.i.g. The vent line is tapped prior to the pressure reducer for a sample line which passes through its own pressure reducer to Dry Ice traps and then to an oxygen analyzer. The control valve in the line for introducing air into the bottom of the reactor into the liquid phase therein and connected to flow regulator and a source of compressed air is in an off position. The reactor is pressurized with nitrogen to about 400 p.s.i.g., and the acetic acid solution is heated to 360° F. The other one-half of the acetic acid solution and the 18.2 parts of p-xylene are combined. When the initial charge in the reactor is at 360° F. air (just above 400 p.s.i.g.) is introduced at a low rate to sweep out the nitrogen. Then the mixture of acetic acid, p-xylene and catalyst is pumped into the reactor at about 3.6 parts per minute. Manual adjustment of the air flow to maintain unreacted oxygen in the vented gas is made. The temperature of the liquid phase in the reactor drops from 360 to 340° F. until sufficient p-xylene had been pumped in for the heat of reaction to make up for the cooling of the air entering the reactor and the acetic acid condensate returning from the vertical condenser. Thereafter the reaction temperature increases sharply to 470° F. at which point the pressure is adjusted to 370 p.s.i.g. to reduce the reaction temperature to 420° F. and air input is increased as needed to maintain unreacted oxygen in the vent gas. The pressure is again increased to 400 p.s.i.g. In about 30 minutes the addition of the p-xylene-acetic acid-catalyst mixture is complete. The oxygen in the vent gas is somewhat irregular (should be somewhat constant within the range of about 2 to 5% by volume on acetic acid free basis during the hydrocarbon addition) reaching a high of 17.8% at minute 10 and a low of 1.3% at minute 20. The run is terminated at 18% $O_2$ in vent gas giving a total reaction time of 49 minutes. The introduction of air is stopped and nitrogen is fed in slowly as the reactor is depressurized to 70 p.s.i.g.

The reactor contents are cooled to 295–300° F. and discharged into a crystallizer at 20 p.s.i.g. The reactor is washed with 97% acetic acid which is flushed into the crystallizer. The crystallizer contents are stirred and cooled to 140° F., depressurized to atmospheric pressure and the terephthalic acid slurry is centrifuged to obtain a terephthalic acid cake which is washed with glacial acetic acid (1 part per part of cake), then removed and dried. The dried terephthalic acid yield from this semicontinuous oxidation is 127 weight percent (156.6 weight percent is 100 mole percent), has an acid number of 675 (theory: 675), a TEG color number of 750, an optical density of 0.552 and a 4-CBA content of 0.13%.

As a comparison terephthalic acid produced at 410 to 420° F. and 310–320 p.s.i.g. under batch operations (all p-xylene charged at once) but recovered, washed and dried as described in Example 1 has an acid number in the range of 668–670, a TEG color number of 1100 to 1400 (optical density of 1.2 to 1.6) and a 4-CBA content of 1.7 to 2.5%.

*Example 2*

Under more steady air control, temperature and pressure control and with slightly different charging conditions, 27 parts of p-xylene are oxidized. This time the oxidation reactor is charged with 162 parts of 97% acetic acid containing sufficient tetrabromoethane and cobalt and manganese acetate tetrahydrates to provide 0.23% bromine and 0.17% total manganese and cobalt based on the weight of p-xylene. This solution is heated under nitrogen to 380° F. with the pressure reducer set in the vent at 320 p.s.i.g. The p-xylene is pumped in at about 0.8 parts per minute and the air flow is started at about 650 standard cubic feet per hour (s.c.f.h.) until the reaction temperature rises to 415–420° F. (about 2 to 3 minutes) at which time the air input is increased to 2900–3000 s.c.f.h. to maintain a 4.2–4.6% oxygen in the vent gas during p-xylene addition. After 34 minutes all the p-xylene is added and the air feed continued at 2900–3000 s.c.f.h. until the oxygen in the vent gas is 18% (5 to 10 minutes after all p-xylene has been added) and the oxidation is terminated.

The terephthalic acid is recovered, washed and dried as in Example 1. By this procedure a 145.9 weight percent yield of terephthalic acid having an acid number of 673, an optical density of 0.100 and a 4-CBA content of 0.73% is obtained.

*Example 3*

The procedure of Example 2 is repeated with 43.3 parts of p-xylene added to 129.9 parts of 97% acetic acid containing the catalyst concentration set forth in Example 2. The acetic acid solution is at 380° F. and 300 p.s.i.g. when air at 650 s.c.f.h. and p-xylene feed at a constant rate of 0.75 parts per minute are introduced. After ten minutes of operation the pressure is adjusted to 320 p.s.i.g. and the reaction temperature is 420° F. The air rate is increased to 3025 s.c.f.h. as soon as reaction temperature begins to increase. The average oxygen in the vent gas during about 58 minutes p-xylene addition is 4.5 and the minimum oxygen in the vent gas is 3.6 percent by volume on an acetic acid free basis. Total reaction time is 66 minutes, 8 minutes for reaction completion after p-xylene addition.

The terephthalic from this process is recovered, washed and dried as before. The dry terephthalic acid is recovered in a 136.3 weight percent yield and has an acid number of 674, a TEG color of 310, an optical density at 380 m$\mu$ of 0.156 and 0.097 percent 4-CBA.

*Example 4*

The procedure of Example 2 is repeated with 57.1 parts of p-xylene introduced at 0.79 part per minute to 114.2 parts of 97% acetic acid at 320 p.s.i.g. and 380° F. containing the concentration of catalyst set forth in Example 2. The initial air rate of 650 s.c.f.h. is increased to 3100 s.c.f.h. when an increase in reaction temperature occurs. The pressure is maintained at 320 p.s.i.g. and a reaction temperature of 411° F. is maintained from the tenth minute after addition of p-xylene is commenced and during 73 minutes of the 76 minutes of p-xylene introduction. The average and minimum oxygen in the vent gas during p-xylene addition is 4.7 and 4.3 percent by volume, respectively, on an acetic acid free basis. The reaction is terminated 7 minutes after all the p-xylene is added.

The terephthalic acid from this process is recovered, washed and dried as before. The dry terephthalic acid is recovered in a 142.2 weight percent yield and has an acid number of 674, a TEG color of 360, an optical density of 0.240 and a 4-CBA content of 0.18 percent.

*Example 5*

The procedure of Example 2 is repeated with 39.8 parts of a mixture of xylenes containing on a weight basis 3% ethylbenzene, 27% p-xylene, 69% m-xylene and 0.8% o-xylene. This $C_8$ aromatic hydrocarbon mixture is introduced at 0.8 part per minute to 103.5 parts of 97% acetic acid containing the catalyst concentration set forth in Example 2 and at 400° F. and 315 p.s.i.g. Air is introduced at 650 s.c.f.h. and the xylene mixture is pumped in at 0.8 parts per minute. The reaction temperature increase occurs about 10 minutes after the xylene addition commences. The air rate is then increased to 3220 s.c.f.h. During the first five minutes of increased air rate the oxygen in the vent gas drops to about 0.1 to 0.2% (same volume basis as before). The xylene addition is intercepted until the oxygen in the vent gas begins to rise. Thereafter, steady xylene addition is resumed and maintained for a total of xylene addition of 50 minutes. The reaction is terminated 6 minutes after all xylene is added. The average oxygen content of the vent gas is 2.3% on the same volume basis as reported before.

The reactor effluent is treated for phthalic acid product recovery as hereinbefore described for terephthalic acid recovery, for under these conditions o-phthalic acid (from o-xylene) and benzoic acid (from ethylbenzene) remain in solution. The dried phthalic acid, a mixture of isophthalic acid and terephthalic acid in a weight ratio of 2.5 to 1, respectively, has an acid number of 674, a TEG color of 230, an optical density of 0.168, 0.008 percent 4-CBA and 0.003 percent 3-CBA is obtained in a 117.8 weight percent yield.

For comparison, when 40 parts of the same $C_8$ aromatic hydrocarbon in the same amount of 97% acetic acid containing the same catalyst concentration is oxidized at 419° F. and 315 p.s.i.g. in a strictly batch oxidation covering 55 minutes of total reaction time, there is recovered 109 weight percent of the dried mixture of iso- and terephthalic acids which has an acid number of 675, a TEG color of 1020, an optical density of 1.2 m$\mu$, 0.058% 4-CBA and 0.009% 3-CBA.

Example 6

A semi-continuous air oxidation is conducted using benzoic acid at 500° F. and a pressure of about 300–320 p.s.i.g. The benzoic acid contains the catalyst concentration set forth in Example 2. There is employed a ratio of benzoic acid to p-xylene of 10 to 1 on a weight basis. An average oxygen of 3 to 5% is maintained in the vent gas during p-xylene addition. Terephthalic acid can be recovered by distilling off most of the benzoic acid solvent and dissolving the remaining benzoic acid in hot water. This process produces improved yields of terephthalic acid containing 0.1% 4-CBA.

Example 7

A series of four semi-continuous oxidations of 98% p-xylene are conducted at 320 p.s.i.g. constant pressure, 428° F. during and after p-xylene addition at the rate of 0.89 part per minute for a total of 52.0 parts for each oxidation (58.5 minutes for p-xylene addition) and a total reaction time of 64 minutes for each oxidation. The amount of acetic acid (97%) used each time is 156 parts containing the catalyst concentration set forth in Example 2 (total metals, cobalt plus manganese is 0.057 weight percent based on the acetic acid). The initial air rate is 650 s.c.f.h. until reaction commences and thereafter is 3560 s.c.f.h. until the reactions are terminated, 5.5 minutes after all the p-xylene is added.

The terephthalic acid from each oxidation is recovered, washed and dried as before. The total yield of dry terephthalic acid from the four oxidations is 144.2 weight percent of the 98% p-xylene charged. The combined four dry terephthalic acid products have an acid number of 675, a TEG color of 70 and a 4-CBA content of 0.090. The 144.2 weight percent yield represents a 94 mole percent yield based on the p-xylene used. This mole percent yield plus the amount of terephthalalic acid remaining dissolved in the acetic acid calculated on the basis of p-xylene not over-oxidized to $CO_2$ and water represents a total mole percent yield of about 97 to 98%.

Example 8

A series of 12 mesitylene oxidations conducted by charging 40 parts of mesitylene to 140 parts of 97% acetic acid containing 1.4 times the catalyst concentration based on aromatic hydrocarbon given in Example 2. The mesitylene is pumped in over a period of 58 minutes for each oxidation. The total reaction time is 78 minutes. The oxidations are carried out at 320 p.s.i.g., about 434° F. during mesitylene addition with initiation at about 425° F. with 650 s.c.f.h. air rate. Air rate thereafter is 3420 s.c.f.h. The trimesic acid is recovered by the same technique as described for terephthalic acid except that crystallization is carried out at a lower temperature. The washed and dried trimesic acid represents a 125 weight percent yield. The composite trimesic acid from the 12 oxidations has an acid number of 797 and a TEG color of 100. This yield is about 10 to 12% above strictly batch operation carried out at about the same conditions and the TEG color of 100 is vastly improved over a TEG color of >1400 of the trimesic acid prepared by strictly batch operation.

The oxygen supplied by air in the foregoing semi-continuous oxidation of mesitylene is about 5 to 7% in excess of the 4.5 moles $O_2$ per mole of mesitylene.

Example 9

Pseudocumene is oxidized to trimellitic acid according to the process of this invention using the same oxidation reactor employed in the previous examples. An acetic acid solution of catalyst is prepared from 127.75 parts of 97% acetic acid and cobalt and manganese and tetrabromoethane. To about one-half of the acetic acid there is added sufficient cobalt, manganese and tetrabromoethane to provide a catalyst concentration of about one-half that employed in Example 1. In the second one-half of the acetic acid there is added sufficient cobalt, manganese and tetrabromoethane to provide a catalyst concentration of 1.5 times that of Example 1. The first acetic acid solution is charged to the oxidation reactor and heated to about 380° F. at 320 p.s.i.g. The pressure reducer in the exit gas line is set at 370 p.s.i.g. The remaining catalyst solution in acetic acid and 36.5 parts of pseudocumene is pumped into the oxidation reactor in about 52 minutes giving a hydrocarbon rate of about 0.70 part per minute. Simultaneous with the pumping of the hydrocarbon and catalyst dissolved in acetic acid, air is introduced into the liquid phase in the oxidation zone at about 700 s.c.f.h. until the temperature of the liquid phase begins to increase and thereafter air is introduced at 2120 s.c.f.h. A reaction temperature of about 430° F. is maintained at about 350 p.s.i.g. during the pseudocumene addition. A peak oxygen concentration in the exit gas of about 8.0% by volume is reached during the start-up and an average oxygen content in the exit gas of about 4% by volume is maintained. A total reaction time of about 120 minutes is used. A trimellitic acid of improved yield and quality is obtainable over strictly batch type oxidation conducted under substantially the same reaction conditions.

The foregoing example illustrates that all the catalyst and solvent need not be added to initiate the reaction and that in some cases where the oxidation is second and third alkyl groups is more difficult, as in the case of the two alkyl group ortho to each other in pseudocumene, it is advantageous to add fresh catalyst as the hydrocarbon is charged. In the case of pseudocumene oxidation when all the solvent and catalyst are first added and the oxidation is conducted at the lower temperature limit for efficient batch oxidation, the semicontinuous oxidation initiates readily but becomes sluggish after about 0.1 of the hydrocarbon is added. Thereafter, as the hydrocarbon addition is continued, the oxidation remains sluggish resulting in the production of large amounts of dimethyl benzoic and methyl phthalic acids rather than the production of trimellitic acid as the desired main product.

The foregoing examples clearly demonstrate the utilization of the semi-continuous process of this invention and the marked improvement in yield and quality of the aromatic acid product obtainable from its use.

The correlation of the rates of addition of the molecular oxygen and polyalkyl aromatic hydrocarbon should be such that the oxygen in the gas (solvent free basis) generated from the reaction mixture should suitably be in the range of 2 to 6% by volume, and preferably in the range of 3 to 5% by volume. The overall quantity of molecular oxygen supplied suitably is in the range of 1.0 to 1.3 times the stoichiometric quantity required for the specific polyalkyl aromatic being oxidized to the aromatic polycarboxylic acid. The precise excess over that required to fulfill the unreacted oxygen in the exit gas is a matter of choice and economics. It is good engineering practice to waste as little of the high pressure oxygen as possible and still achieve the desired results.

From the foregoing, it is seen that the oxidation of polyalkyl benzenes to higher yields of benzene polycarboxylic acids of higher purity can be achieved by the semi-continuous oxidation process of this invention than can be achieved from the strictly batch operation first commercially employed utilizing the oxidation method carried out in the presence of the catalyst system comprising a combination of heavy metal and bromine ions.

What is claimed is:

1. A process for the preparation of benzene polycarboxylic acids of high purity in yields above 80 mole percent from the catalytic oxidation of a polymethylbenzene having 2 to 4 methyl groups with air in an oxidation zone in which is maintained a liquid phase of a monocarboxylic acid solvent selected from the class consisting of $C_2$ to $C_8$ saturated aliphatic monocarboxylic acids and benzoic acid, the liquid phase of said acid solvent having a catalyst system consisting essentially of ions of bromine and heavy metals, which process consists essentially of introducing into said liquid phase of said acid solvent containing ions of bromine and heavy metal at a temperature of 350 to 380° F. air and said polymethylbenzene simultaneously until an increase in temperature of said liquid phase occurs at an air rate of about 14 to about 40 s.c.f. per pound of said polymehylbenzene introduced, thereafter increasing the air input to a rate in the range of from about 50 to 71 s.c.f. per pound of said polymethylbenzene introduced to maintain a reaction temperature of said liquid phase in the range of from 400 to 475° F. and an average oxygen concentration in the gasiform mixture from said liquid phase of at least 2% and not exceeding a maximum of about 8% during the introduction of said polymethylbenzene, terminating the introduction of said polymethylbenzene when the weight ratio of said acidic solvent to said polymethylbenzene is in the range of 1 to 10 and continuing the air introduction for a time equal to about 0.1 to 1.0 times the time of introducing all of said polymethylbenzene wherein the total air introduced provides molecular oxygen in the range of from about 1.5 to about 2.0 moles per mole of said polymethylbenzene, terminating the introduction of air and withdrawing the resulting reaction mixture from the oxidation zone for recovery of the benzene polycarboxylic acid.

2. The process of claim 1 wherein acetic acid is the solvent in the reaction zone liquid phase.

3. The process of claim 1 wherein benzoic acid is the solvent in the reaction zone liquid phase.

4. The process of claim 1 wherein the weight ratio of acidic solvent to the total introduced polymethylbenzene is in the range of 3 to 5.

5. The process of claim 1 wherein the catalyst system heavy metal component is supplied by a combination of ions of cobalt and manganese in an amount of from 0.15 to 0.40 percent and the bromide ions are in an amount of from 0.2 to 0.5 percent both by weight based on the total of said polymethylbenzene to be introduced.

6. The process of claim 1 wherein said polymethylbenzene is a xylene.

7. The process of claim 1 wherein said polymethylbenzene is pseudocumene and one-half the acidic solvent and a major portion of the catalyst system is also simultaneously introduced with pseudocumene and air into the oxidation zone.

8. The process of claim 1 wherein said polymethylbenzene is mesitylene.

9. The process of preparing from p-xylene terephthalic acid in yields of 90 mole percent and above characterized by a purity of above 99.5 percent, an optical density of less than 0.5, and a 4-carboxybenzaldehyde content of less than 0.5 weight percent which process consists essentially introducing into a reaction zone containing a liquid phase of acetic acid having a total concentration of cobalt and manganese ions in the range of from 0.04 to 0.09 percent and bromide ion concentration in the range of from 0.05 to 0.10 percent, both by weight based on the acetic acid, air and p-xylene simultaneously at a temperature of said liquid phase of 350 to 380° F. and a pressure of 300 to 400 p.s.i.g. with an air rate of 14 to 40 s.c.f. per pound of p-xylene introduced until the temperature of the liquid phase increases and thereafter increasing the rate of introduction of air to the range of 50 to 71 s.c.f. per pound of p-xylene being introduced to maintain a temperature in said liquid phase in the range of from about 400 to 450° F. and an average oxygen concentration in the gasiform mixture from the oxidation zone in the range of from 2 to 4% by volume on an acetic acid vapor free basis all during the addition of p-xylene, terminating the introduction of p-xylene when the weight ratio of acetic acid to p-xylene is in the range of 2 to 3, continuing the introduction of air until at least 3 moles of oxygen and not more than 3.3 moles of oxygen per mole of p-xylene have been introduced and then terminating the introduction of air, and withdrawing the resulting reaction mixture, cooling the withdrawn reaction mixture to a temperature in the range of from 100 to 140° F., separating terephthalic acid from the cooled reaction mixture, washing the terephthalic acid whereat terephthalic acid of the foregoing yield and purity is obtained.

10. The process of claim 9 wherein the resulting reaction mixture is cooled in the oxidation zone to 290 to 300° F. and discharged into a crystallization zone at 20 p.s.i.g., cooled rapidly to 140° F. to form a slurry of terephthalic acid crystals and terephthalic acid is recovered by centrifugation of said slurry.

References Cited

UNITED STATES PATENTS 3,089,907 5/1963 Saffer et al. _____ 260—524

FOREIGN PATENTS 804,612 11/1958 Great Britain.
807,091 1/1959 Great Britain.

LORRAINE A. WEINBERGER, *Primary Examiner.*

S. B. WILLIAMS, *Assistant Examiner.*